United States Patent [19]

Park, II

[11] Patent Number: 5,778,050
[45] Date of Patent: Jul. 7, 1998

[54] PORTABLE LINE TEST TELEPHONE

[76] Inventor: Young Park, II, #916-19, Daerim-dong, Yungdeungpo-gu, Seoul 150-070, Rep. of Korea

[21] Appl. No.: 379,069

[22] Filed: Jan. 27, 1995

[30] Foreign Application Priority Data

May 20, 1994 [KR] Rep. of Korea ............... 1994-11263

[51] Int. Cl.$^6$ .................. H04M 1/24; H04M 3/08; H04M 3/22
[52] U.S. Cl. ................ 379/21; 379/22; 379/27; 379/30
[58] Field of Search ............... 379/21, 27, 28, 379/30, 32, 34

[56] References Cited

U.S. PATENT DOCUMENTS 4,843,620  6/1989  Hagedorn .................. 379/21
4,868,858  9/1989  Faith .......................... 379/21
5,025,466  6/1991  Hilligoss et al. ............ 379/21
5,157,708  10/1992 Garthwaite et al. ........ 379/21
5,235,629  8/1993  Butler et al. ................ 379/21

*Primary Examiner*—Curtis A. Kuntz
*Assistant Examiner*—Binh K. Tieu
*Attorney, Agent, or Firm*—Stephen C. Wieder

[57] ABSTRACT

The portable line test telephone of the present invention consists of the switching means to operate different kinds of tests, the high voltage generating means to measure telephone capacity and insulation resistance, the dialing means to call and the call circuit means to talk with a subscriber or the called. Accordingly, line operator can make direct tests and examine telephone capacity, earth, line disconnection, line cross, insulation resistance with calling and talking with a subscriber.

1 Claim, 4 Drawing Sheets

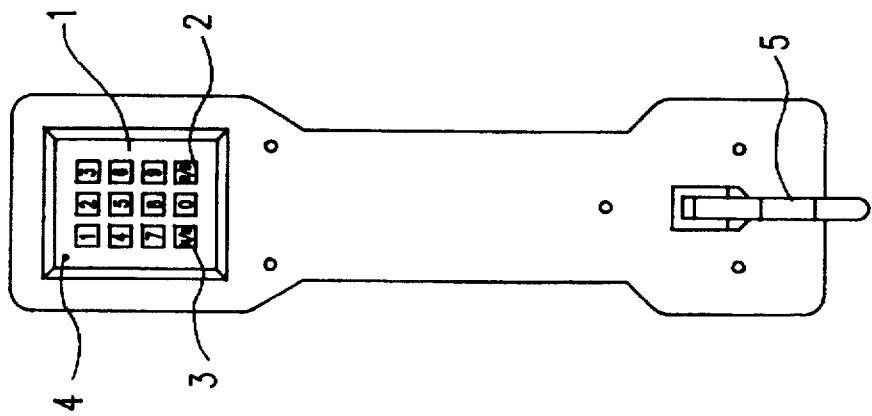
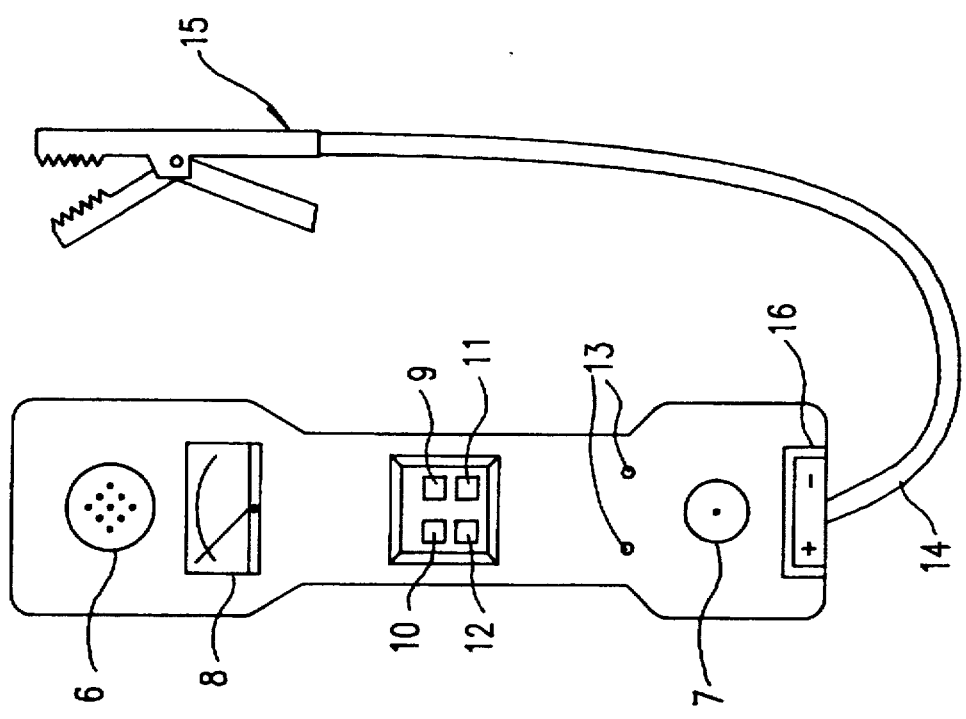

PORTABLE LINE TEST TELEPHONE

FIELD OF THE INVENTION

The present invention relates to a portable line test telephone and, more particularly, to a portable line test telephone with which users themselves can test rapidly and efficiently telephone subscriber lines for the purpose of installation of new lines and line repair & maintenance.

BACKGROUND OF THE INVENTION

As is well known, the telephone lines go through complicated processing of the switching system in a central office, underground telecom tunnels & ducts, and poles on the ground and lead to a subscriber's premises. In order to maintain the best quality of voice and data communications services, a lineman has to make frequent patrol check of the telephone lines and sake prompt actions against line fault.

To repair a line fault, a lineman transports and carries some of heavy equipment and make a field test or request a personnel of the test room in the central office to test the troubled line and then can handle it after he is notified the line conditions and fault state from the test room.

As such, carrying heavy equipment and repairing with help of the test room arise deteriorated mobility and long repairing time. Moreover, as the staff of the test room are pressed with overwork like continued test requests, many inconveniences follow.

Especially, the present invention is the improved type of the portable line test telephone which is shown in Korean Patent NO. 57450 as prior art of the present inventor.

An object of the present invention is to provide a portable line test telephone with which the lineman can carry out rapid repairing work directly calling and talking with a subscriber and checking subscriber line conditions such as telephone condenser capacity, insulation resistance, line cross or disconnection.

In achieving the above object, the present invention resides in a portable line test telephone which comprises,
a switching means for operating different tests;
a high voltage generating means for measuring the telephone capacity and insulation resistance;
a dialing means for calling a subscriber; and
a call circuit means for talking with the called or a subscriber.

In a portable line test telephone of the present invention to be composed of the above mentioned means, the lineman call a subscriber and handle direct tests such as telephone capacity, earth, line disconnection, line cross and insulation resistance.

The foregoing object and advantages of the present invention will become clear by the following description of the invention with reference to the accompanying drawings.

BRIEF DESCRIPTION OF THE DRAWINGS

FIG. 1 is a front view of the present invention.

FIG. 2 is a rear view of the Present invention.

DESCRIPTION OF THE PREFERRED EMBODIMENT

Figure 3:
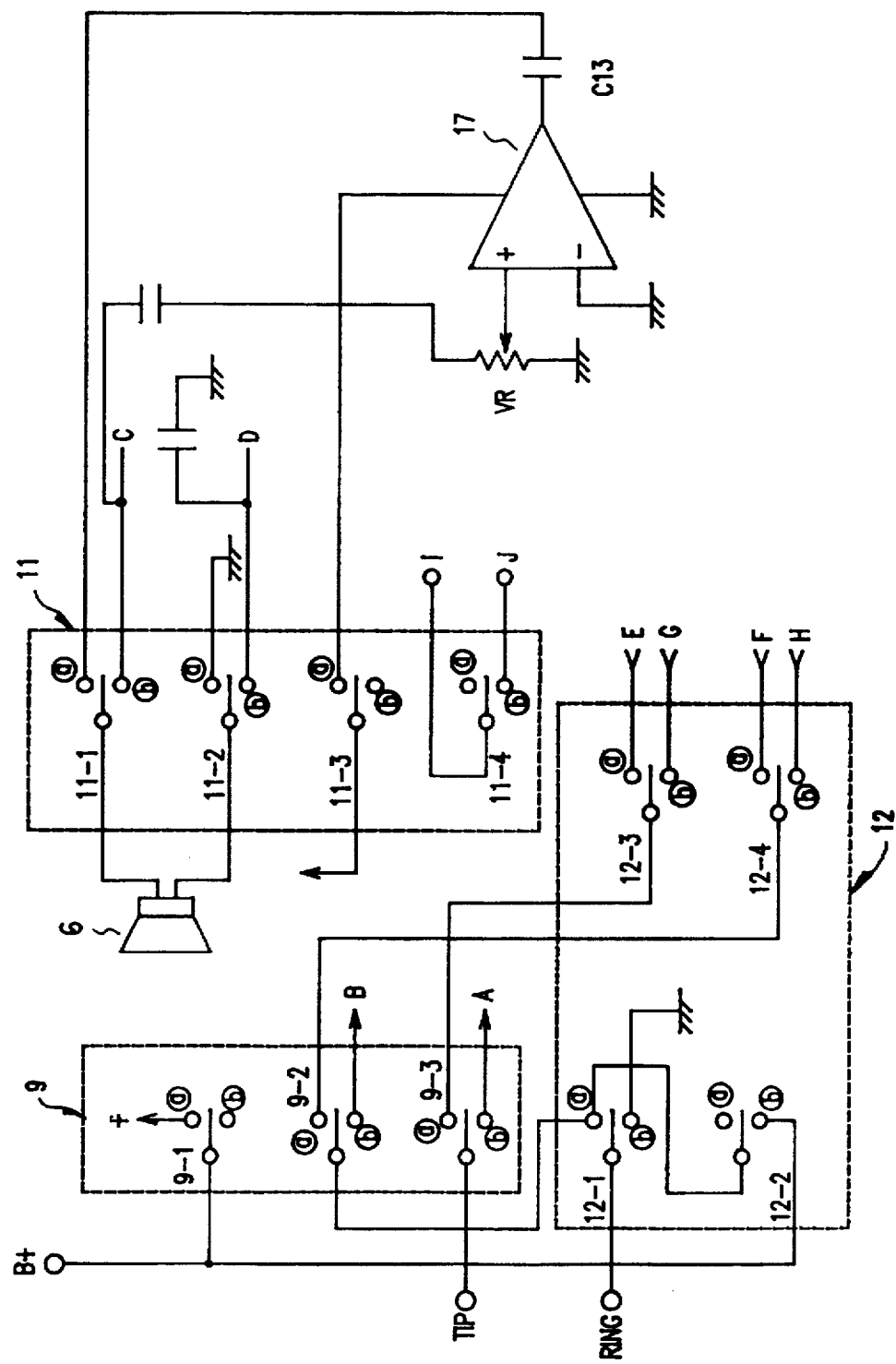
FIG. 3 is a circuit diagram of a switching means of the present invention.

FIG. 1 and FIG. 2 show the external construction of the portable line test telephone according to the present invention, which includes a key pad 1 providing on the upper back side to enter a telephone number 0 to 9, a redial push switch 2 and a hook switch 3 attached to said key pad 1, a dialing indicator 4 to sense a dialing on the key pad 1, a hook 5 to fix to the waist belt or somewhere, a receiver 6 providing on the upper front side to hear the voice signal, a transmitter 7 providing on the below front side to send a lineman's voice, a meter 8 to indicate the measured value of insulation resistance and telephone condenser capacity, a measuring switch 9 to measure subscriber telephone condenser capacity and insulation resistance, a tone/pulse switch 10 to select the switching mode of electronic or electromechanical exchange, a monitor switch 11 to select auto response service ARS or hear amplified voice, a call switch 12 to call a subscriber, two lamps 13,13 to display said switches 11 and 12 are turn on or turn off, a lead wire 14 to connect the lines and a clip 15 providing at the end of lead wire combined for one-point and multi-point. The numeral 16 which is not described is a battery case.

FIG. 3 is a circuit diagram of a switching means of the present invention. The measuring switch 9 consists of three contact switches 9-1, 9-2 and 9-3.

To measure insulation resistance or telephone condenser capacity, the switches 9-1, 9-2 and 9-3 should be on and be connected to the contact point ⓐ. The contact point ⓐ of the contact switch 9-1 to be applied the battery power (B+) is connected to plus (+) terminal.

The contact point ⓑ of the contact switch 9-3 and the contact point ⓑ of the contact switch 9-2 connected to the TIP line are separately connected to the terminal A and B. The contact point ⓐ of the contact switch 12-1 belonged to the call switch connected to the RING line is connected to the contact switch 12-2 and the contact switch 9-2.

When the call switch 12 is on to call a subscriber, the contact point switches 12-3 and 12-4 of the call switch 12 connected to the contact point ⓐ are connected to the contact point ⓐ of the contact switch 9-3 and 9-2 of the measuring switch 9. The contact point ⓐ and the contact point ⓑ of the contact switch 12-3 and the contact point ⓐ and the contact point ⓑ of the contact switch 12-4 are separately connected to the terminal E, the terminal G, the terminal F and the terminal H.

When a monitor switch 11 is on to hear amplified voice, the contact switches 11-1 and 11-2 that touch the contact point ⓐ are connected to the receiver 6. The contact point ⓑ of the contact switch 11-1 is connected to the terminal C and at the same time to the plus (+) input terminal of an operational amplifier 17 through a variable resistor VR.

The contact point ⓐ of the contact switch 11-2 is grounded and the contact point ⓑ is connected to the terminal D. The output terminal of the operational amplifier 17 grouned to minus(−) input terminal is connected to the contact point ⓐ of the contact switch 11-4. The contact point ⓐ and the contact point ⓑ of the contact switch 11-4 are connected respectively to the terminal I and J.

Figure 4:
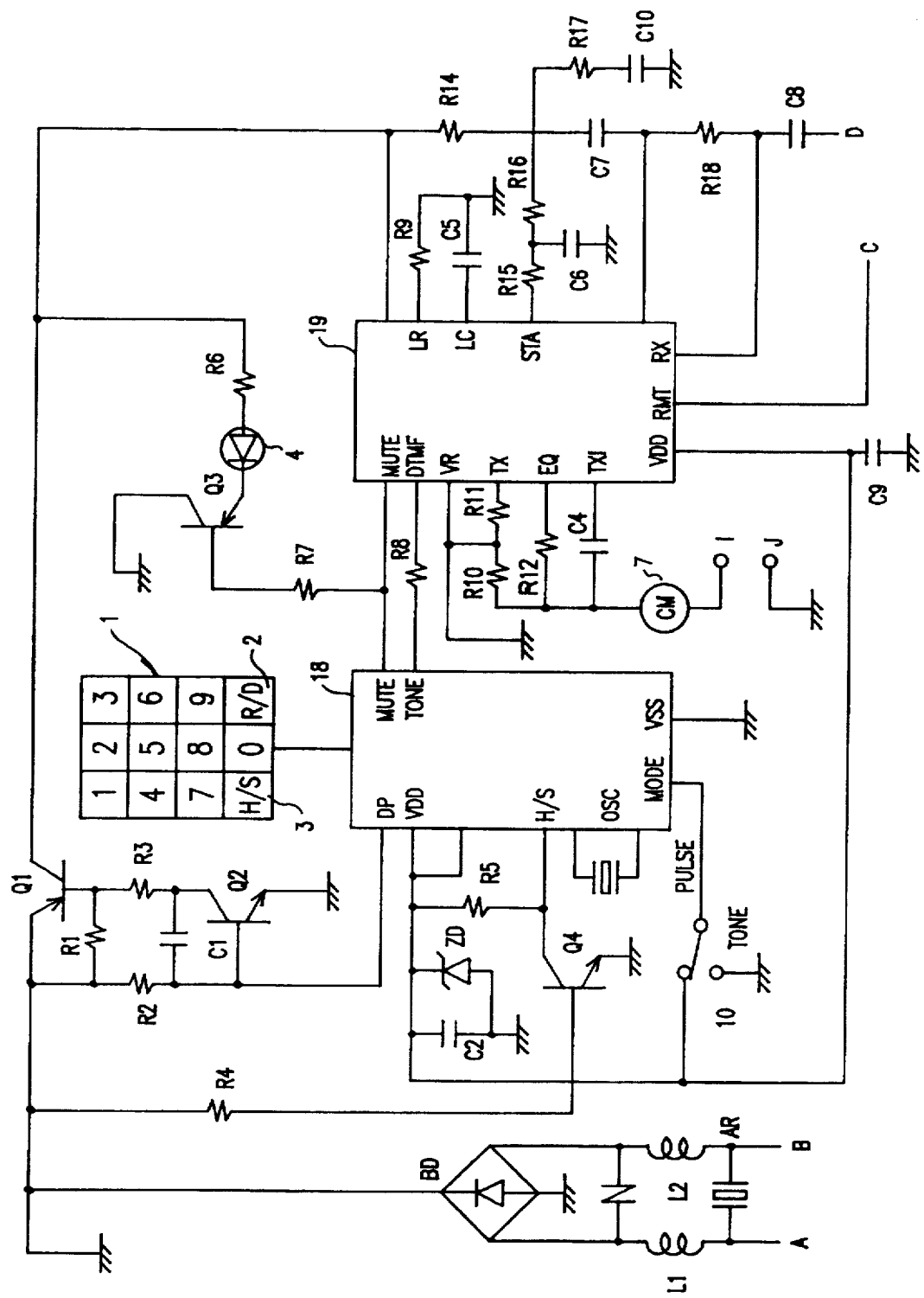
FIG. 4 is a circuit diagram of a dialing means and a call circuit means of the present invention.

FIG. 4 shows the composition of a dialing means and a call circuit means of the present invention.

A bridge diode BD Is connected to the terminal A and B of the measuring switch 9 through a serge observer AR, inductor L1, L2 and a serge observer TNR.

Even though the TIP and RING line is exchanged by the clip 15 of the lead wire 14, normal voltage is supplied. The voltage passed the bridge diode BD is applied to the base of a transistor Q4.

The signal of "low" is input in a hook switch terminal H/S of the tone/pulse dial IC 18.

The power terminal VDD of the tone/pulse dial IC 18 passes a static voltage diode ZD, and is connected to a pulse terminal of the tone/pulse switch 10. And, the tone terminal of the tone/pulse switch 10 Is ground.

When an operator enters a phone number with the numbers 0 to 9 of the key pad 1 and uses a hook switch 3 or a redial push switch 2, a dial pulse terminal DP of the tone/pulse dial IC 18 starts either a transistor Q3 or Q2 selectively and makes the dialing indicator 4 worked.

The mute terminal MUTE of the tone/pulse IC 18 is connected to the base of the power transistor Q3 of the dialing indicator 4 and simultaneously is connected to the mute terminal MUTE of the call circuit IC 19. At the transmission terminal TX of the call circuit IC 19 that received the voice signal passed the tone terminal TONE of the tone/pulse IC 18 through the dual tone multi frequency terminal DTMF, the frequency is selected and modulated by resistors R10, R11, R12 and condenser C4.

The resistors R10, R11, R12 and condenser C4 are connected to the transmitter 7, i.e. a ceramic micro phone CM.

When the terminal I and J are connected by the contact switch 11-4 of the monitor switch 11, a caller's voice is input through the ceramic micro phone CM.

The voice signal is output to the terminal C and D through the receiving terminal RX or the receiver terminal RMT. The frequency is selected and modulated by the resistors R15, R16 and condenser C6, C7 connected to the side tone amplifier terminal STA.

Figure 5:
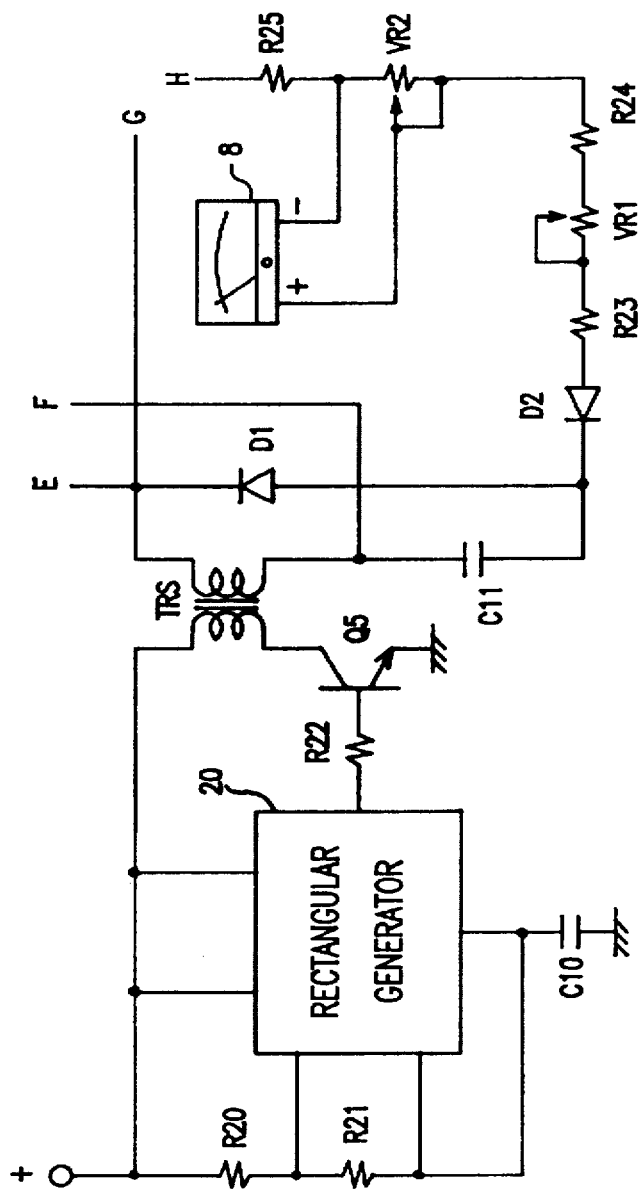
FIG. 5. is a circuit diagram of a high voltage generating means of the present invention.

FIG. 5 shows the composition of a high voltage generator.

The DC power is input through the plus (+) terminal of the contact switch 9-1 of the measuring switch 9 passes the resistors R20, R21 and is converted to AC power by a rectangular generator 20.

The AC power is boosted through the transformer TRS and the boosted AC power is applied to the call switch 12 through the terminal E, F and is converted to DC power again on the way to the diode D1, D2 and rectifier circuit of the condenser C11. And the value of this power modulated by the variable resistor VR1, VR2 is displayed on the meter 8 and at the same time is applied to the call switch 12 through the terminal G and H.

When an operator makes a call with the portable line test telephone according to the present invention, the clip 5 of the lead wire 14 are connected to the subscriber line. And then, the TIP line is connected to the contact point of ⓑ of the contact switch 9-3 of the measuring switch 9 and the terminal A. The RING line is connected to the contact point ⓐ of the contact switch 12-1 of the call switch 12 and the terminal B.

The power voltage of the telephone line inputted through the terminal A and B is suppied the bridge diode BD through the surge observer AR that protects the telephone circuit against lightning or thunder, therefore, stable voltage of the call circuit is provided regardless of the polarity of TIP and RING line.

The electronic mode or electromechanical mode is selected by switching the tone/pulse switch 10 to the pulse terminal PULSE or the tone terminal TONE.

When an operator dials using the key pad 1 of the tone/pulse dial IC 18 and switches on the monitor switch 11 and the contact point ⓐ is connected, the voice signal output through the terminal C and D of the call IC 19 is amplified at the amplifier 17.

Accordingly, the operator can hear loud voice amplified at the receiver 6 without putting this telephone hand set on his ear.

To measure the insulation resistance of the subscriber line, high voltage of DC Is needed. When an operator connects the TIP and RING terminal with the subscriber line to be measured and switch on the measuring switch 9, the DC voltage of 9 volt input through the plus(+) terminal of the masuring switch 9 is converted to rectangular AC power through the rectangular generator 20.

The transistor Q5 is turn on by the rectangular AC power through the resistor R22, and the high AC voltage is induced at the second side of the transformer TRS and output to the terminal E and F. And at the same time, the AC voltage is converted to the DC voltage through the power rectifier circuit of diode D1, D2 and condenser C11 and the value is indicated on the scale of the meter 8.

Therefore, the conditions of the telephone lines can be judged according to the value of resistance to be indicated on the meter 8, and looking into the moving condition of scale of the meter 8, the capacity of telephone can be measured.

That is, the resistance value of the telephone lines has a predetermined value and the indicator of the meter 8 indicates a predetermined resistance value. However, in case of telephone capacity, the DC cut-off condednser is charged and discharged. The indicator gets close to "0" under the charged condition, otherwise the indcator gets down slowly under the discharged condition.

Looking into this condition, presence or absence of a telephone set can be checked. When the call switch 12 is turn on, the state of insulation resistance measuring is converted to the state of subscriber calling.

When the operator switches on the measuring switch 9 with the subscriber calling switched on, the vlotage through the plus(+) terminal is induced to the second side of the transformer TRS. The voltage passes the terminal E, F of the call switch 12 and the measuring switch 9 and then TIP line and RING line.

Therefore, the state of call and the state of dialogue(under the condition that the power from the central office is not connected) is together converted. So, the operator can talk with the called directly.

When the operator connects the pulse terminal PULSE of the tone/pulse switch 10 and enters the numbers on the key pad 1, the pulse of "low" equivalent to the number on the number key at the mute terminal MUTE of the tone/pulse dial IC 18 is generated. Therefore, the dialing indicator 4 is blinking according to the number entered.

Consequently, the portable line test telephone of the present invention has the advantage that the operator doesn't have to carry big and heavy testers and wait for the test result from the test room of the central office.

In addition, the amplified monitor switch enables the operator to work hearing loud voice without putting the handset on his ear.

What is claimed is:

1. A portable line test telephone for measuring the telephone line receiving and transmitting with a subscriber or a central office using the lead wire connected to a TIP line and a RING line, comprising:

a measuring switching means composed of three contact switches for measuring an insulation resistance and a telephone capacity, connecting the TIP line selectively to three terminals +, A or B;

a call switching means composed of four contact switches for calling and talking with the subscriber, connecting the TIP line or the RING line selectively to four terminal E, F, G or H with connecting the RING line to said measuring switching means;

a monitor switching means composed of four contact switches for amplifing the voice to be output through the terminal C, D at a call IC and for operating a ceramic microphone;

a tone/pulse switching means which notifies the connecting condition of the pulse or tone terminal connecting the voltage passed the terminal A, B of said measuring switching means connecting the tone/pulse dial IC input through the hook switch terminal HS;

a key pad means composed of the number keys 0 to 9, a hook switch, redial push switch and a dialing indicator that displays the working condition and connected to the tone/pulse dial IC; and an indicating means such as a meter for indicating the value of insulation resistance or telephone capacity with DC voltage, said DC voltage is converted from AC voltage which is alternated and boosted through a rectangular generator and transformer, through a power rectifier circuit consisted of diode and condenser.

* * * * *